(12) United States Patent
Radtke et al.

(10) Patent No.: US 8,619,503 B2
(45) Date of Patent: Dec. 31, 2013

(54) SPARKER TYPE WELLBORE SEISMIC ENERGY SOURCE HAVING CONTROLLABLE DEPTH INDEPENDENT FREQUENCY

(75) Inventors: Robert P. Radtke, Kingwood, TX (US); Robert H. Stokes, Austin, TX (US); David A. Glowka, Red Rock, TX (US)

(73) Assignee: Technology International, Inc., Kingwood, TX (US)

( * ) Notice: Subject to any disclaimer, the term of this patent is extended or adjusted under 35 U.S.C. 154(b) by 694 days.

(21) Appl. No.: 12/893,396

(22) Filed: Sep. 29, 2010

(65) Prior Publication Data

US 2011/0090764 A1    Apr. 21, 2011

Related U.S. Application Data

(60) Provisional application No. 61/253,264, filed on Oct. 20, 2009.

(51) Int. Cl.
*G01V 1/157* (2006.01)

(52) U.S. Cl.
USPC .......................................................... 367/147

(58) Field of Classification Search
USPC .......................................................... 367/147
See application file for complete search history.

(56) References Cited

U.S. PATENT DOCUMENTS

| 3,341,811 | A | 9/1967 | Piety |
| 2006/0260804 | A1 | 11/2006 | O'Malley |
| 2009/0154290 | A1* | 6/2009 | Radtke et al. ................... 367/25 |
| 2011/0090764 | A1* | 4/2011 | Radtke et al. ................. 367/147 |

FOREIGN PATENT DOCUMENTS

GB    2377496 A    1/2003

OTHER PUBLICATIONS

International Search Report and Written Opinion, International Application PCT/US2010/050683.
Radtke, R. et al., "Low Frequency Drill Bit Seismic While Drilling", OTC paper 20250, May 6, 2009.
Black, B., J., "Technology International Inc: Seismic While Drilling Project", Crada 2008-107, U.S. Department of Energy, Rocky Mountain Oil Test Center.

* cited by examiner

*Primary Examiner* — Daniel Pihulic
(74) *Attorney, Agent, or Firm* — Richard A. Fagin (57) ABSTRACT

A wellbore seismic source includes a sparker electrically coupled to a power source. The sparker is disposed in a pressure-sealed canister, wherein the canister is at least partially filled with liquid. At least one of the pressure of the liquid and the energy discharged by the power source through the sparker is selected to cause emission of acoustic energy at a selected frequency.

19 Claims, 6 Drawing Sheets

SPARKER TYPE WELLBORE SEISMIC ENERGY SOURCE HAVING CONTROLLABLE DEPTH INDEPENDENT FREQUENCY

CROSS-REFERENCE TO RELATED APPLICATIONS

Priority is claimed from U.S. Provisional Application No. 61/253,264 filed on Oct. 20, 2009.

STATEMENT REGARDING FEDERALLY SPONSORED RESEARCH OR DEVELOPMENT

Not applicable.

BACKGROUND OF THE INVENTION

1. Field of the Invention

The invention relates generally to the field of seismic surveying of subsurface rock formations. More specifically, the invention relates to seismic energy sources that can be used in wellbores drilled through rock formations.

2. Background Art

Seismic geological mapping techniques known in the art include seismic surveys made from within wellbores drilled through the earth. Such surveys are known in the art as "vertical seismic profile" surveys ("VSPs"). One objective of obtaining a VSP in a wellbore is to be able to determine the velocity of seismic energy through the various layers of the earth by directly measuring seismic travel time from the earth's surface to a known depth within the wellbore in the earth. Velocity information is important in order to infer depths of subsurface structures mapped from surface-acquired seismic surveys.

One type of VSP technique includes actuating a seismic energy source at the earth's surface and measuring seismic travel time to a seismic receiver disposed in the wellbore at known depths. Typically such receivers are lowered to selected depths in the wellbore at one end of an armored electrical cable ("wireline"). Another VSP method, called "inverse VSP", includes positioning a seismic energy source in a wellbore at selected depths, actuating the source and detecting seismic energy using receivers disposed at the earth's surface. Various types of seismic sources and seismic receivers are known in the art for use in a wellbore.

Although the foregoing VSP techniques are referred to for convenience as "wireline" techniques, the discussion below with respect to the limitations of such techniques is equally applicable to VSP techniques where the source or receiver is conveyed into the wellbore by means of drill pipe, coiled tubing, or the like. Irrespective of the actual conveyance mechanism used, wireline VSP techniques known in the art typically require that the wellbore already be drilled in order to position the source or receiver at any selected depth in the wellbore. In many instances, it is desirable to have an estimate of seismic velocity prior to actually drilling through particular formations, not the least important reason for which is because some formations have fluid pressure in pore spaces therein which exceeds pressures normally encountered at identical depth levels. As is well known in the art, estimates of seismic velocity may be used to make estimates of fluid pore pressure prior to drilling through these formations. Estimates of such pressures may be made, for example, using VSP techniques known in the art by temporarily stopping drilling, and inserting a receiver or source into the wellbore at or near the bottom of the wellbore and taking a so-called "checkshot" survey. In a checkshot survey, a seismic travel time from the known depth in the wellbore to the earth's surface is used to "calibrate" seismic surveys made entirely at the earth's surface in order to better estimate formation fluid pressure in as-yet-undrilled formations. However, stopping drilling to make checkshot surveys using techniques known in the art is time consuming, and thus expensive.

It is known in the art to include a seismic receiver in the drill string (drilling tool assembly) during drilling operations in order to reduce the time used to obtain VSP data while a wellbore is being drilled. In this technique, a seismic source is actuated at the earth's surface, as in other types of VSP surveys, and signals are recorded in appropriate circuits coupled to the receiver in the wellbore. Several types of wellbore seismic receivers for use during drilling are known in the art. See for example, U.S. Pat. No. 5,555,220 issued to Minto. A limitation to the technique of obtaining a VSP survey while drilling using a receiver in the drill string is that the broad range of signals detected by the receiver typically cannot be completely interpreted with available downhole processing means until the drill string (having the receiver therein) is removed from the wellbore. It is necessary to remove the receiver from the wellbore and interrogate the contents of the recording device because while-drilling measurement systems known in the art are typically limited to relatively slow forms of signal telemetry, such as mud pressure modulation or low-frequency electromagnetic telemetry. While-drilling telemetry systems known in the art are generally limited to a data rate of about 5 to 10 bits per second. As a result, even with data compression techniques known in the art, interrogating a wellbore seismic receiver substantially in real time is impracticable. Another operating consideration when using drill string mounted seismic receivers is the need to substantially stop drilling operations during the times at which seismic signals are to be detected. In many cases, the amount of acoustic noise caused by movement of the drill string within the wellbore is such that detecting seismic signals is difficult while drilling operations are in progress.

Another while-drilling VSP survey technique known in the art uses the drill bit as a seismic energy source. In this technique, a pilot sensor is mounted at the top of the drill string, and seismic sensors are deployed at the earth's surface. Signals detected by the seismic sensors are cross-correlated to the signals detected by the pilot sensor to determine the impulse response of the earth. Drill bit VSP techniques known in the art include methods for determining a closer representation of the drill bit seismic signature, and time correcting the pilot signal for seismic travel time through the drill string. Limitations of drill bit-source VSP techniques known in the art include, foremost, that roller cone drill bits must be used. In many drilling situations, it is preferable to use fixed cutter bits, such as polycrystalline diamond compact ("PDC") bits. In such cases, it has proven substantially impossible to obtain a usable seismic signal from the bit. It is also known in the art that the seismic energy radiation pattern of roller cone bits is such that when the wellbore inclination from vertical exceeds about 30 to 40 degrees, the amount of seismic energy reaching the earth's surface proximate the equivalent surface location of the wellbore is very small. As a result of the limitations of bit-source VSP methods known in the art, the practical applications of bit-source VSPs have been limited.

Alternatively, a seismic energy source can be positioned in the wellbore and actuated at selected times during drilling. Seismic sources known in the art for use while drilling have generally not performed sufficiently well to be commercially useful. As a result, there is a need for an improved seismic energy source for use while drilling operations are in progress.

Another seismic energy source for use while drilling a wellbore is disclosed in U.S. Patent Application Publication No. 2004/0240320 filed by McDonald et al. The source according to this aspect of the invention includes a drive shaft adapted to be coupled in a drill string, and a housing rotatably supported outside the drive shaft. At least one contact member is disposed on an exterior of the housing and is selectively urged into contact with a wall of a wellbore surrounding the housing. The source includes means for selectively controlling a force applied to the at least one contact member.

Another type of seismic energy source usable within wellbores is described in U.S. Patent Application Publication No. 2009/0154290 filed by Radtke et al., the underlying patent application for which is commonly owned with the present invention. The source described in the foregoing publication includes a method for operating an impulsive type seismic energy source in a firing sequence having at least two actuations for each seismic impulse to be generated by the source. The actuations have a time delay between them related to a selected energy frequency peak of the source output. One example of the method is used for generating seismic signals in a wellbore and includes discharging electric current through a spark gap disposed in the wellbore in at least one firing sequence. The sequence includes at least two actuations of the spark gap separated by an amount of time selected to cause acoustic energy resulting from the actuations to have peak amplitude at a selected frequency. While a single pulse creates frequencies which increase with depth, the frequencies generated by the method described by Radtke et al. can be independent of depth by suitable operation of the sparker. However, for frequencies greater than 40 Hz, the power supply must be capable of generating very rapid pulse rates, or using multiple sparkers and power supplies pulsing at slower rates and timed to produce the desired fundamental frequency. It is desirable to have a system that does not require a special power supply is described herein.

A limitation to using a conventional sparker is that the frequency of the seismic energy emitted increases as the vertical depth of the source in the wellbore increases. The depth will generally be related to the hydrostatic pressure in the wellbore and thus on the source. The reason for the foregoing can be explained as follows.

When an underwater high energy spark impulse occurs, a bubble is formed that expands outward until the pressure inside the bubble reaches ambient pressure and then the bubble collapses. This process produces two high energy pressure pulses, one at the initial impulse and one on bubble collapse. The time between these two pressure pulses is referred to as the bubble period. The bubble period is a function of the energy involved in the initial impulse and the ambient pressure. Theoretical calculations of the bubble period are based on the modified Rayleigh-Willis formula shown below.

$$T=(0.000209)(0.7)(KQ)^{1/3}/(d+33)^{5/6}$$

Wherein T is the bubble period in seconds, d is the depth in feet, K is a constant ($10^{10}$) when Q, the energy is measured in kilojoules The frequency spectrum produced by this impulse is a mean frequency that is approximately the reciprocal of the time difference between the formation and collapse of the bubble.

What is needed is a seismic energy source for use in a drill string that has selectable frequency output independent of depth of the source in the wellbore.

SUMMARY OF THE INVENTION

A wellbore seismic source according to one aspect of the invention includes a sparker electrically coupled to a power source. The sparker is disposed in a pressure-sealed canister, the canister filled with liquid. A pressure of the liquid and an energy discharged by the power source through the sparker are selected to cause emission of acoustic energy at a selected frequency.

A method for generating seismic energy in a wellbore according to another aspect of the invention includes discharging electrical energy across a spark gap disposed in the wellbore. The spark gap is disposed in liquid held at a selected pressure. At least one of the pressure and an energy discharged through the spark gap is selected to generate seismic energy at a selected frequency.

Other aspects and advantages of the invention will be apparent from the following description and the appended claims.

DETAILED DESCRIPTION

Figure 1:
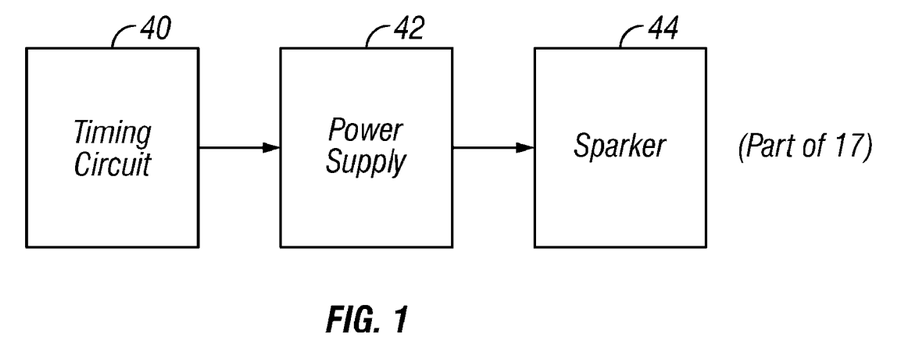
FIG. 1 shows a control circuit for a sparker type seismic energy source.
Figure 1A:
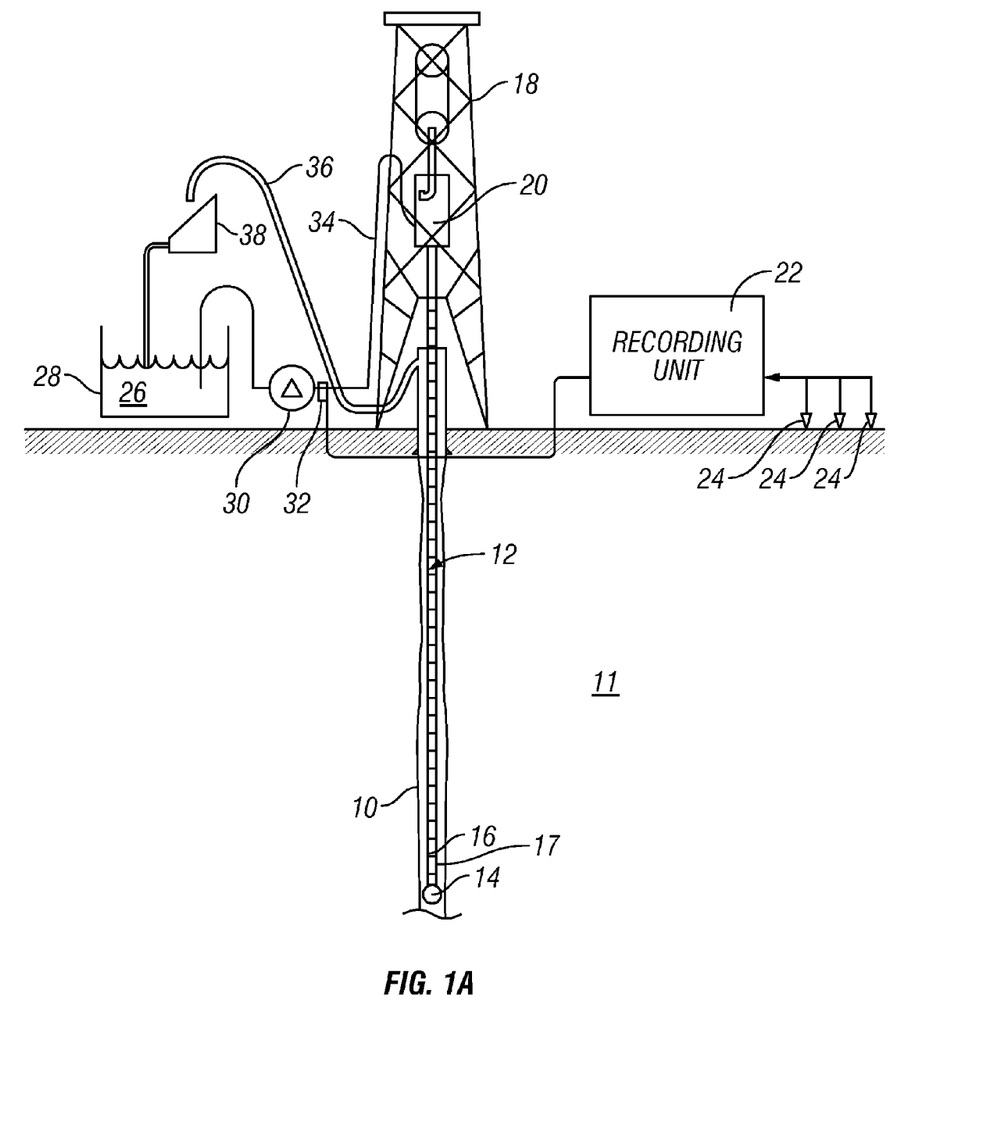
FIG. 1A shows a drilling system that may use an example seismic source according to the invention.

The invention is described by way of an example of a sparker type seismic energy source deployed in a pressure sealed container or canister. The canister may be used in a wellbore drilled through subsurface formations. The manner of conveyance of the canister is not a limit on the scope of the invention. FIG. 1A shows an example of a seismic energy source that can be used while drilling a wellbore through subsurface rock formations. A drilling rig 18 or similar hoisting device supports a drill string 12. The drill string 12 may be a length of conduit or pipe assembled from threadedly coupled segments or "joints" coupled end to end. The lower end of the drill string 12 has a drill bit 14 including a seismic while drilling source 17 coupled thereto. The bit 14 includes cutting elements (not shown) configured to gouge and/or crush rock formations 11 by action of rotation of the bit 14 and axial force caused by application of some of the weight of the drill string 12 to the bit 14. A signal acquisition and processing sub 16 ("sub") may include an electric power source such as a turbine operated generator (not shown separately) and circuitry to control operation of the seismic while drilling source 17. The sub 16 may also include other sensing devices none shown separately), for example, gamma ray sensors, resistivity sensors, density sensors and neutron porosity sensors for use while drilling. The sub 16 may also include a device (not shown separately) to modulate flow of a drilling fluid through the drill string 12 so as to communicate signals from the various sensors to a recording unit 22 at the Earth's surface. Other devices for communicating signals may include electromagnetic or acoustic telemetry along the drill string 12. The presence of and the type of signal communication device are not intended to limit the scope of the present invention.

During drilling, a pump 30 lifts drilling fluid ("mud") 26 from a tank or pit 28. The mud 26 is discharged by the pump 30 under pressure into a standpipe/hose combination 34. The mud 26 then flows into a rotating, sealed connection such as may be present in a top drive 20, or a kelly (not shown). The mud 26 then travels under pressure through an interior passage in the drill string 12. The mud 26 eventually exits through courses or nozzles (not shown) in the drill bit 14. After being discharged, the mud 26 cools and lubricates the bit 12, and lifts drill cuttings to the surface. At the surface, the mud 26 may pass through treatment devices 38 such as a degasser and shale shaker, to remove entrained gas and cuttings from the mud 26. After cleaning, the mud 26 is returned to the tank 28 for reuse.

The pressure of the mud 26 in the drill string may be modulated to convey signal information, as explained above. In such cases, one or more pressure transducers 32 may be configured to measure pressure in the standpipe 34. Pressure measurements may be conveyed to the recording unit 22 for decoding and interpretation. When seismic measurements are being made, as shown in FIG. 1, the recording unit 22 may also be in signal communication with one or more seismic sensors 24 disposed in suitable locations. In examples where seismic while drilling operations are conducted on the land surface, the seismic sensors 24 may be single or multi-component geophones, accelerometers or other particle motion sensing devices. In marine operations, the sensors 24 may be hydrophones or other pressure or pressure time gradient responsive sensors. The type of seismic sensor is not a limit on the scope of the present invention. It is also within the scope of the present invention to position the seismic sensors 24 in another wellbore (not shown) for cross-well imaging. It is also within the scope of the present invention to use the seismic while drilling source during any aspect of operation of the wellbore, including, without limitation, tripping, wiping, reaming, and circulating. Any description relative to drilling is only intended to provide context and examples of when and how a seismic while drilling source may be used in a wellbore.

It will be appreciated by those skilled in the art that the example conveyance shown in FIG. 1A is only one example of conveyance of the seismic source 17 through a wellbore. The source 17 may also be conveyed by, without limitation, coiled tubing, production tubing, wireline (armored electrical cable), slickline and pumping. Accordingly the example shown in FIG. 1A is not intended to limit the manner of conveyance of the source 17.

Figure 8:
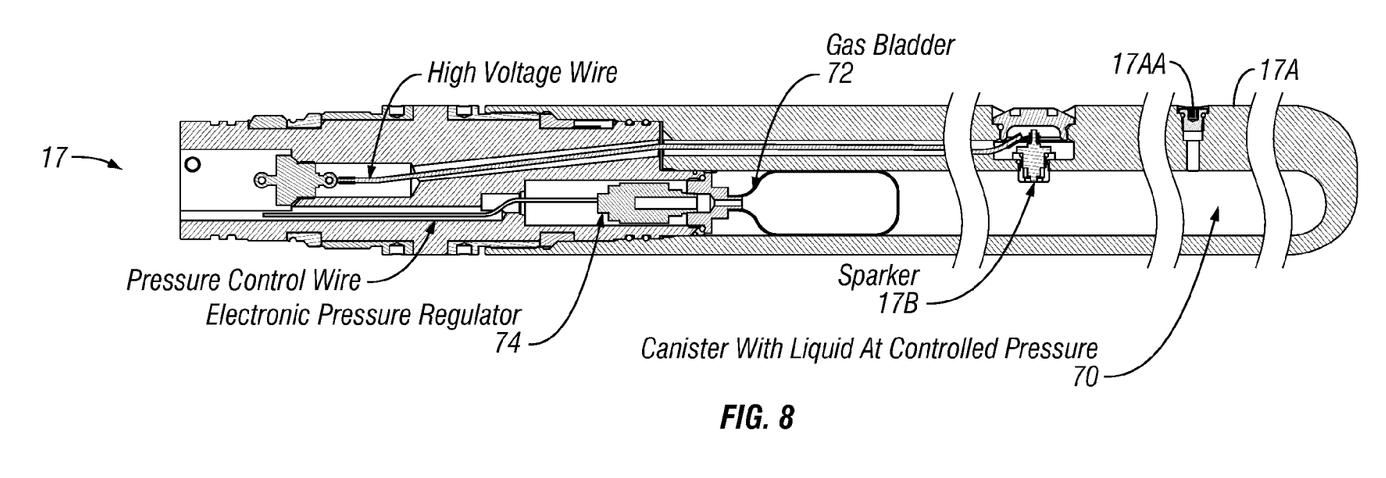
FIG. 8 shows an example variable frequency sparker source.

The seismic energy source 17 in the present example uses a spark gap (referred to as a "sparker") to produce seismic energy by discharge of electric energy across the spark gap. FIG. 1 shows a timing and control circuit 40 used to cause operations of a power supply 42 connected to a sparker 44. The foregoing components form part of the source (17 in FIG. 1A). In some examples, the foregoing components may be used with a linear acoustic technique as described in U.S. Patent Application Publication No. 2009/0154290 filed by Radtke et al. The single electrode sparker 42 system is simple to implement and has demonstrated very reliable operation. The Radtke et al. '290 publication is incorporated herein for all purposes in its entirety. The sparker 42 may be in the form of an annular electrode coupled to the power supply as shown in FIG. 1. The timing and control circuit 40 may also be used to control pressure inside a chamber in a canister as will be explained below with reference to FIG. 8.

Figure 2:
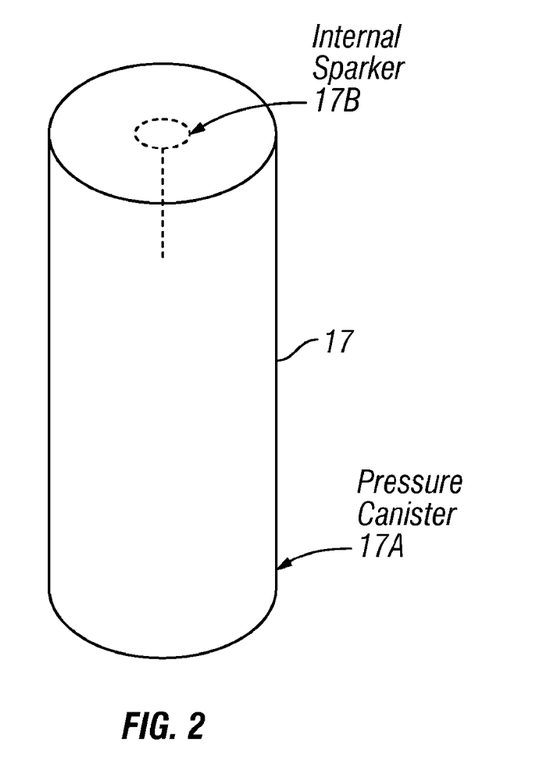
FIG. 2 shows enclosing the sparker in a pressure resistant canister.

Referring to FIG. 2, it has been determined through experimentation that if the sparker 17B is placed inside a pressure sealed canister 17A, however, the sparker 17B will always operate at the same frequency, independently of the depth in a wellbore to which the sparker 17B is disposed. The frequency is related to the pressure in the canister 17A. As an example, if the canister fluid pressure is equivalent to two foot depth in water (about 0.9 psi) and the energy dissipated in each spark is 200 Joules, the bubble period of the bubble created by the spark will be 9 milliseconds, and produce acoustic energy with a fundamental frequency of approximately 110 Hz. If the same 200 Joule energy source is used at a thirty foot depth equivalent pressure, it will produce a fundamental frequency of 200 Hz. To insure that the canister does not interfere with the bubble, the inside volume of the canister 17A should be large relative to the bubble size. As an example if a typical bubble has a radius of two inches in its volume is:

$$V = 4(\pi)(r^3)/3$$

$$V = 4(\pi)(2^3)/3$$

$$V = 33.49 \text{ cubic inches}$$

The volume of the canister is determined by the area of the canister multiplied by its length. If the canister 17A is cylindrical with two inch radius and 12 inch length, the following calculation may be used.

$$V = (\pi)r^2 \times L$$

$$V = (3.14)2^2 \times 12$$

$$V = 150.7 \text{ cubic inches}$$

From the above calculations is can be determined that a four inch diameter canister, twelve inches long will have a volume much larger than the bubble emitted by the sparker and should be adequate for the intended purpose.

The sparker 17B can essentially be designed to operate at any selected frequency by proper selection of energy in the spark and fluid pressure inside the canister. In some examples the amount of spark energy can be controlled and/or the liquid pressure in the canister can be controlled to select the desired frequency. Those skilled in the art will be able to readily devise apparatus to accomplish either selection mechanism.

Figure 3:
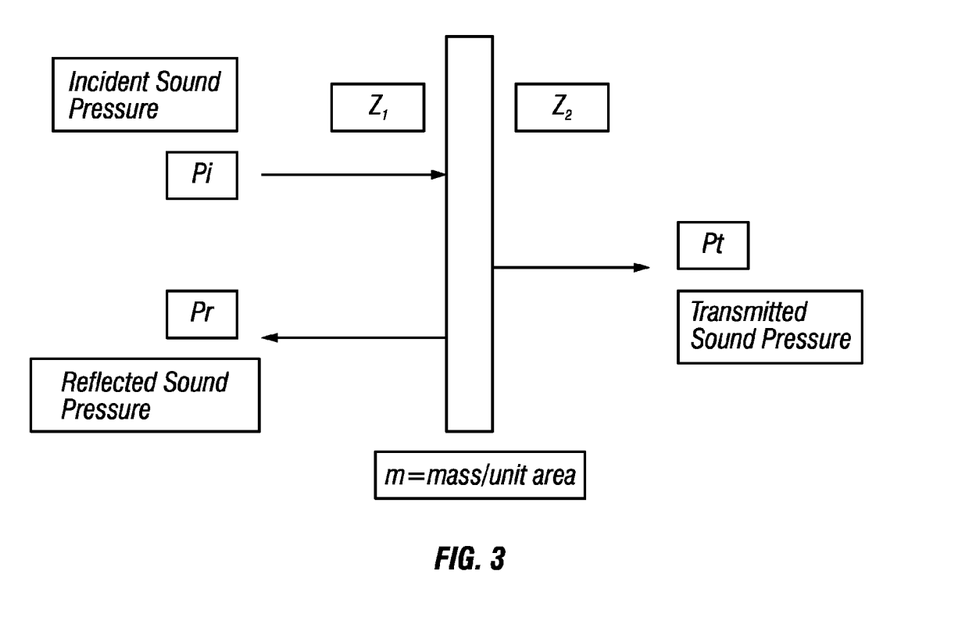
FIG. 3 shows sound transmission paths from the sparker in FIG. 2.

The canister 17A can be made, for example, of stainless steel thick enough to withstand the hydrostatic pressures expected in a wellbore. Steel walls of ⅛- ¼ inches thickness will typically be adequate to withstand such pressures, thus making the pressure inside the canister independent of the hydrostatic pressure in a wellbore. The sound transmitted through (Pt) and reflected (Pr) by a steel plate is illustrated in FIG. 3. $Pt/Pi = 2Z_2/(Z_2 + Z1 + j\omega m)$.

$$Pr/Pi = (Z_2 - Z_1 + j\omega m)/(Z_2 + Z_1 + j\omega m)$$

where $\omega = 2(\pi)(f)$. Where water is disposed on both sides of the steel plate:

$$Pt/Pi = 2Zwater/2Zwater + j\omega m$$

$$Pr/Pi = j\omega m/(2Zwater + j\omega m)$$

Those skilled the art will recognize that if the plate is of such thickness that $k\tau \ll 1$, where $k=2\pi f/c$, $\tau$=thickness of the plate and $c$=speed of sound in steel, the sound transmission will move directly from medium one (water in the canister) through the plate into medium two (water or mud in the wellbore) with negligible effect on the transmission of sound from one medium to another.

As an example if the thickness of the canister is 0.6 cm (¼ in), $$k\tau=(2\pi f/c)(0.6)$$

$$k\tau=(0.6)(2)(\pi)(110\ \text{Hz})/5.05\times10^5\ \text{cm/sec}$$

$$k\tau=8.2\times10^{-6}$$

From the above calculation is can be observed that $k\tau \ll 1$ and therefore the canister will not attenuate the 110 Hz sound significantly.

It is possible to obtain transmission of substantially all the acoustic power emitted from the sparker into the wellbore, avoiding transmission up the drill string (see FIG. 1A), by use of an intermediate medium whose impedance is the geometric mean of the two surrounding media. Such technique for obtaining substantially complete transmission is made possible by the use of a quarter-wavelength thick intermediate layer in the canister (17A in FIG. 2). Conversely it is possible to obtain substantially complete reflection of the acoustic power by the use of a one half-wavelength thick layer in the canister.

Figure 4:
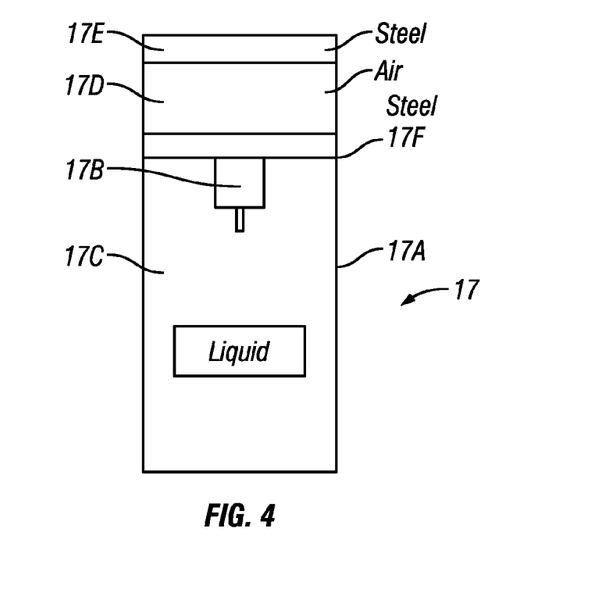
FIG. 4 shows a modified canister to cause most sound energy to be transmitted downwardly.

The velocity of sound in the particular composition of stainless steel used is $5.05\times10^5$ cm/sec; therefore one half-wavelength will be about 75 ft. This is too large a thickness for practical use in a wellbore source but the top end cap of the canister can be configured in a way that will significantly reduce the sound transmitted up the drill string (see FIG. 1) for those implementations used in a drill string. It is possible to build an end cap on the canister that will substantially reduce the acoustic energy transmission up the drill string from the sparker. As illustrated in FIG. 4 sound is transmitted through a lamination of plates from one medium into another medium; if the acoustic energy transmission goes from water 17C through a steel plate 17F to air 17D the reflectivity coefficient will be substantially equal to 1 and the transmission coefficient will be substantially zero, as could be desired to prevent transmission up the drill string (tubular loss). The plates may be substituted by a bladder (not shown) that enables the air pressure in the air filled 17D chamber to be maintained substantially at the same pressure as the liquid 17C in the canister 17A.

Figure 5:
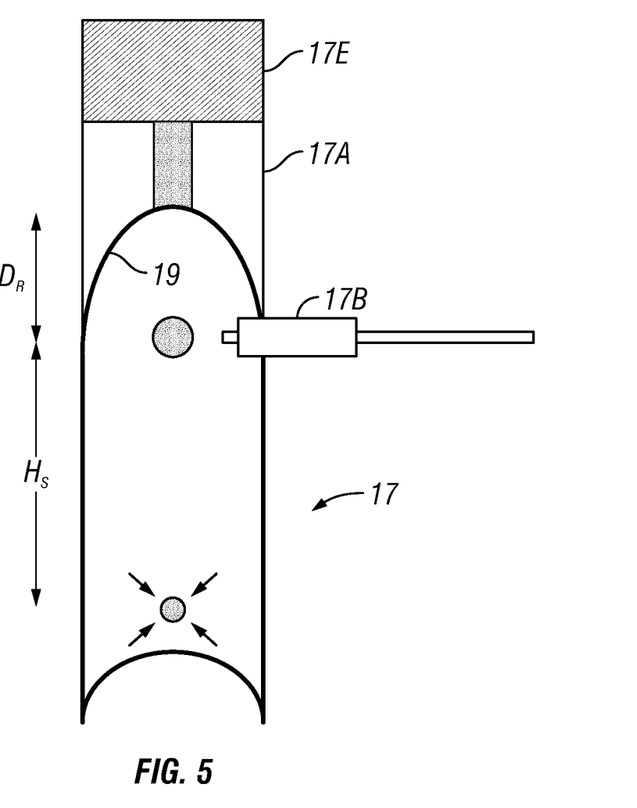
FIG. 5 shows a reflector canister to improve source output.

The structure of the canister shown in FIG. 4, can be improved further by shaping the canister 17A in the form of an acoustic reflector, or including a reflector 19 inside the canister 17A. The top end can be configured in a way to significantly reduce the acoustic energy transmission up the drill string or other sparker conveyance as explained with reference to FIG. 4. FIG. 5 shows a sparker 17B situated near the mouth of a reflector 19 mounted in the upper end of the liquid-filled canister (the end cap of FIG. 4 may be omitted in the present configuration). The depth of the reflector cavity is $D_R$. After forming in the corona of the spark, a bubble expands and moves away from the reflector. The bubble collapses within a fraction of a second, at a distance $H_S$ from the sparker. Pressure pulses are generated both when the bubble forms and when it collapses.

The first pressure pulse that reaches the lower end of the reflector vessel is the bubble expansion pulse that travels directly from the expanding bubble. This pressure pulse, which radiates in all directions from the bubble, also reflects off the top of the reflector cavity and reaches the lower end of the canister some time later. The pressure pulse resulting from bubble collapse also impacts the lower end of the canister, followed by the reflection of the collapse pressure pulse from the top of the reflector cavity.

The concept of superposition of the pressure pulses means that if appropriately timed, the reflected bubble expansion pulse can reach the bottom of the canister at the same time as the directly transmitted bubble collapse pulse. The reflector has the potential for greatly improving the quality of the acoustic source by increasing the peak pressures that reach the lower end of the vessel. If properly designed, the lower end of the canister should be relatively transparent to the acoustic waves that travel through it and into the wellbore.

The reflector also increases the amount of acoustic energy traveling into the wellbore, regardless of its timing relative to bubble collapse, by reflecting back some of the energy that would otherwise travel into the wellbore tool or drill string above it; and this also improves the quality of the acoustic signal coupled into the rock.

Whether or not the bubble-collapse pressure is amplified depends on the timing of the reflected energy, which in turn depends on the depth of the reflector and the bubble collapse location.

Figure 6:
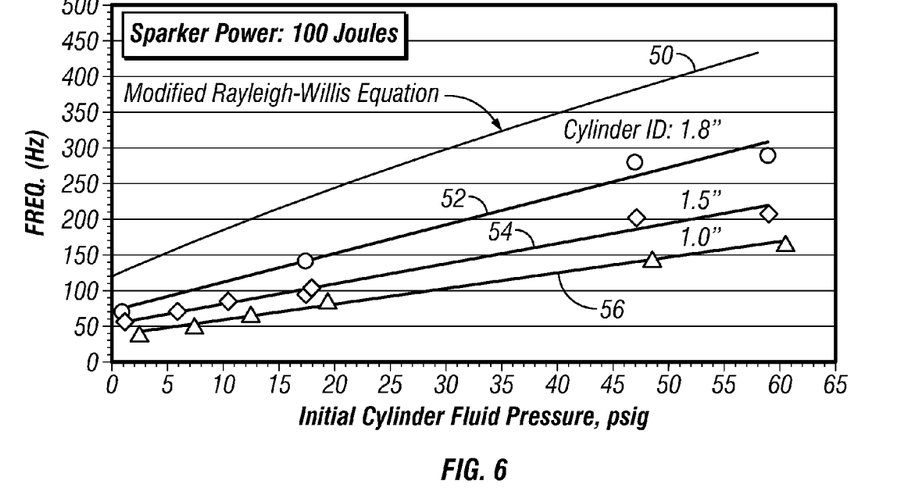
FIG. 6 shows graphs of frequency output of a canister enclosed sparker with respect to canister diameter and internal canister pressure for 100 Joule sparker energy.

It has also been determined through experimentation that the frequency output of the canister enclosed sparker is related to energy output of the sparker, the internal pressure in the canister and the diameter of the canister. FIG. 6 shows graphs of frequency output of a canister enclosed sparker with respect to canister diameter and internal canister pressure for 100 Joule sparker energy. Curve 50 shows the expected frequency output calculated using a modified Rayleigh-Willis equation. Curves 52, 54, and 56, show, respectively, interpolated results for sparker discharge experiments performed at selected pressures wherein the canister is 1.8 inches, 1.5 inches and 1.0 inches in diameter. The symbols at specific frequencies show the pressures at which the individual tests were performed. In all the tests shown in FIG. 6, the sparker energy was set to 100 Joules.

Figure 7:
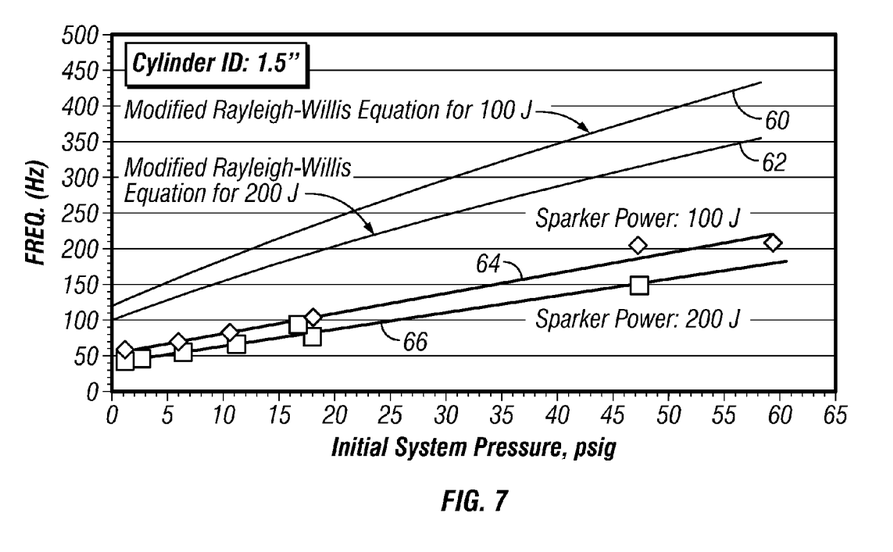
FIG. 7 shows graphs of frequency output of a sparker enclosed in a 1.5 inch diameter canister with respect to internal canister pressure and sparker energy.

FIG. 7 shows graphs of frequency output of a sparker enclosed in a 1.5 inch diameter canister with respect to internal canister pressure and sparker energy. Curves 60 and 62 represent, respectively, expected frequency output of the source using the modified Rayleigh-Willis equation for a sparker energy of 100 and 200 Joules. Curves 64 and 66 represent interpolated results of actual tests performed at 100 and 200 Joules energy, respectively, wherein the symbols on the curves represent the actual test pressures in the canister.

Using the above empirically determined relationships, it is possible to design a sparker source that will have suitable frequency for seismic exploration. It is also possible to include a pressure release valve or other device to gradually reduce (or increase) the pressure in the canister during operation in order to change the operating frequency while the source (17 in FIG. 1) is disposed in the wellbore. A practical example of such a system is shown in cross-section in FIG. 8. The canister 17A may include a fill plug 17AA to enable filling an interior chamber 70 with suitable liquid. It has been determined through experimentation that locating the sparker 17B to the side of the chamber 70 appears to provide suitable results. The sparker 17B may be disposed in a suitable opening in the side of the canister 17A and sealed with a pressure proof plug 17BB. The interior of the chamber 70 may include a gas-filled bladder 72 that is initially charged to a selected pressure to generate the maximum frequency required when the device is disposed in a wellbore. A pressure regulator (release valve) 74 may be operated by a controller (may form part of 40 in FIG. 1) to selectively release pressure from the bladder 72 into an atmospheric pressure portion of the interior of the canister 17A, typically where electronic circuitry is disposed. By controllably releasing pressure from the bladder 72 and repeating operation of the sparker, seismic energy may be generated at a plurality of different frequencies, as suggested by the graphs in FIGS. 6 and 7.

Those skilled in the art will appreciate that the pressure could be increased instead during operation, however, it is expected that design of a pressure release would simplify the design considerably.

As will be appreciated by those skilled in the art, examples which use the timing and control circuits more fully described in U.S. Patent Application Publication No. 2009/0154290 filed by Radtke et al., a multiple spark discharge technique may be used to generate seismic energy independently of the pressure in the canister. In a particular example, the sparker is actuated at least twice, with a time delay between actuations selected to cause generation of seismic energy at a selected frequency.

A sparker type source for seismic exploration from within wellbores drilled through subsurface formations can have the advantages of precise timing control, reliable operation and controllable frequency, as well as flexibility in the manner of conveyance into and out of a wellbore.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A wellbore seismic source, comprising:
   a sparker electrically coupled to a power source, the sparker having a spark gap disposed in a pressure-sealed canister, the canister at least partially filled with liquid, the canister made from a material and configured to have an internal pressure independent of a pressure outside the canister;
   wherein at least one of a pressure of the liquid and an energy discharged by the power source through the sparker is selected to cause emission of acoustic energy at a selected frequency.

2. The source of claim 1 wherein the canister comprises stainless steel.

3. The source of claim 1 further comprising an end cap having an enclosed air space proximate a top end thereof.

4. The source of claim 1 further comprising a bladder disposed in the liquid that maintains the same pressure in the liquid as in the air space.

5. The source of claim 4 further comprising a pressure control to selectively control pressure in the bladder.

6. The source of claim 5 wherein the pressure control selectively releases pressure from the bladder.

7. The source of claim 1 comprising an end cap having an air space that limits the acoustic energy that can be transmitted upwardly through a tool string.

8. The source of claim 1 having a sound absorbing material within the canister configured to limit an amount of acoustic energy that can be transmitted upwardly.

9. The source of claim 1 having a tuned spring retention that limits the acoustic energy that can be transmitted through an upper part of the canister.

10. The source of claim 1 further comprising a reflector disposed proximate the sparker.

11. The source of claim 4 wherein the reflector is disposed at a height above a bottom of the canister such that a portion of the reflected acoustic energy reaches the bottom of the canister at substantially the same time as a portion of the directly transmitted acoustic energy.

12. The source of claim 1 wherein an internal diameter of the canister is selected to provide a selected acoustic energy output frequency at a selected liquid pressure.

13. The source of claim 1 wherein the energy discharged through the sparker is selected to provide a selected acoustic energy output frequency at a selected liquid pressure.

14. The source of claim 1 wherein the power supply is configured to discharge energy through the sparker at least twice with a time delay between the discharges selected to cause generation of acoustic energy at a selected frequency.

15. The source of claim 1 wherein the spark gap is disposed proximate a side of the canister.

16. A method for generating seismic energy in a wellbore, comprising:
    discharging electrical energy across a spark gap disposed in the wellbore, wherein the spark gap is disposed in liquid held at a selected pressure independent of an hydrostatic pressure in the wellbore and at least one of the liquid pressure is selected and an amount of energy discharged through the spark gap is selected to generate seismic energy at a selected frequency.

17. The method of claim 16 further comprising changing the liquid pressure and repeating the discharging electrical energy across the spark gap to generate seismic energy at a different predetermined frequency.

18. The method of claim 16 further comprising changing the amount of energy in the act of discharging to generate seismic energy at a different predetermined frequency.

19. The method of claim 16 further comprising discharging electrical energy across the spark gap at least a second time after a time delay selected to cause generation of seismic energy at a selected frequency.

* * * * *